(12) United States Patent
Verma et al.

(10) Patent No.: US 12,018,952 B2
(45) Date of Patent: Jun. 25, 2024

(54) SYSTEM AND METHOD FOR VEHICLE ROUTING USING BIG-DATA

(71) Applicant: MAGNA INTERNATIONAL INC., Aurora (CA)

(72) Inventors: Rajeev Verma, Troy, MI (US); Benjamin Saltsman, Bloomfield Township, MI (US)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 387 days.

(21) Appl. No.: 17/293,535

(22) PCT Filed: Nov. 13, 2019

(86) PCT No.: PCT/US2019/061244
§ 371 (c)(1),
(2) Date: May 13, 2021

(87) PCT Pub. No.: WO2020/102399
PCT Pub. Date: May 22, 2020

(65) Prior Publication Data
US 2022/0146272 A1 May 12, 2022

Related U.S. Application Data

(60) Provisional application No. 62/760,574, filed on Nov. 13, 2018.

(51) Int. Cl.
*G01C 21/34* (2006.01)
(52) U.S. Cl.
CPC ..... *G01C 21/3446* (2013.01); *G01C 21/3461* (2013.01); *G01C 21/3469* (2013.01); *G01C 21/3492* (2013.01)

(58) Field of Classification Search
None
See application file for complete search history.

(56) References Cited

U.S. PATENT DOCUMENTS

| | | | |
|---|---|---|---|
| 8,332,247 B1 | 12/2012 | Bailey et al. | |
| 2011/0184642 A1* | 7/2011 | Rotz | G01C 21/3492 |
| | | | 701/533 |

(Continued)

FOREIGN PATENT DOCUMENTS

| | | |
|---|---|---|
| CN | 107958315 A | 4/2018 |
| EP | 2354762 A1 | 8/2011 |

OTHER PUBLICATIONS

Adulyasak et al., "Models and Algorithms for Stochastic and Robust Vehicle Routing with Deadlines", Transportation Science 50, 2, May 2016, pp. 608-626 (Year: 2016).*

(Continued)

*Primary Examiner* — Tamara L Weber
(74) *Attorney, Agent, or Firm* — Dickinson Wright PLLC

(57) ABSTRACT

A system and method for determining an optimal route between an origin and a destination along one or more road segments is provided. The system includes a controller disposed within a vehicle and configured to determine the optimal route between the origin and the destination. A first data source provides the server with data regarding current and/or future conditions on a plurality of road segments. A second data source provides the server with data regarding actual traversals of the plurality of road segments. The system solves a backward problem to extract probability distribution functions for how each of several factors affect time and energy required to traverse each of the plurality of road segments. The system also solves a forward problem to apply the probability distribution functions, using data (Continued)

regarding actual conditions to determine the optimal route that is optimized for both of time and energy consumption.

12 Claims, 11 Drawing Sheets

(56) References Cited

U.S. PATENT DOCUMENTS

| | | | |
|---|---|---|---|
| 2012/0232783 A1* | 9/2012 | Calkins | G01C 21/3469 701/411 |
| 2013/0245943 A1* | 9/2013 | Hiestermann | G01C 21/3469 701/533 |
| 2013/0302756 A1* | 11/2013 | Takeuchi | B60W 30/18 434/64 |
| 2016/0076899 A1 | 3/2016 | Macneille et al. | |
| 2016/0202074 A1 | 7/2016 | Woodard et al. | |
| 2017/0059342 A1* | 3/2017 | Rajendran | G01C 21/3461 |
| 2018/0023971 A1 | 1/2018 | Konig et al. | |
| 2018/0172462 A1* | 6/2018 | De Nunzio | G01C 21/343 |
| 2018/0340784 A1* | 11/2018 | Upadhyay | F01N 9/007 |
| 2019/0346275 A1* | 11/2019 | Kelly | G01C 21/3415 |

OTHER PUBLICATIONS

Cao et al., "Finding the Shortest Path in Stochastic Vehicle Routing: A Cardinality Minimization Approach", IEEE Transactions on Intelligent Transportation Systems, vol. 17, No. 6, Jun. 2016, pp. 1688-1702 (Year: 2016).*
European Patent Office Communication, Oct. 19, 2022, 10 pgs.
Office Action regarding corresponding CN App. No. 201980074591.8; dated Jan. 13, 2024.
CN Third Office Action regarding corresponding CN App. No. 201980074591.8; Apr. 1, 2024; 17 pgs.
Ma Yongfeng, et al.; Optimal route arithmetic with multigoals in highway network based on travel decision-making; Journal of Traffic and Transportation Engineering, No. 3; Jun. 15, 2007; 6 pgs.
Long Qiong, et al.; Dynamic route guidance method facing driver's individual demand; Journal of Central South University (Science and Technology), No. 5; May 26, 2013; 6 pgs.

* cited by examiner

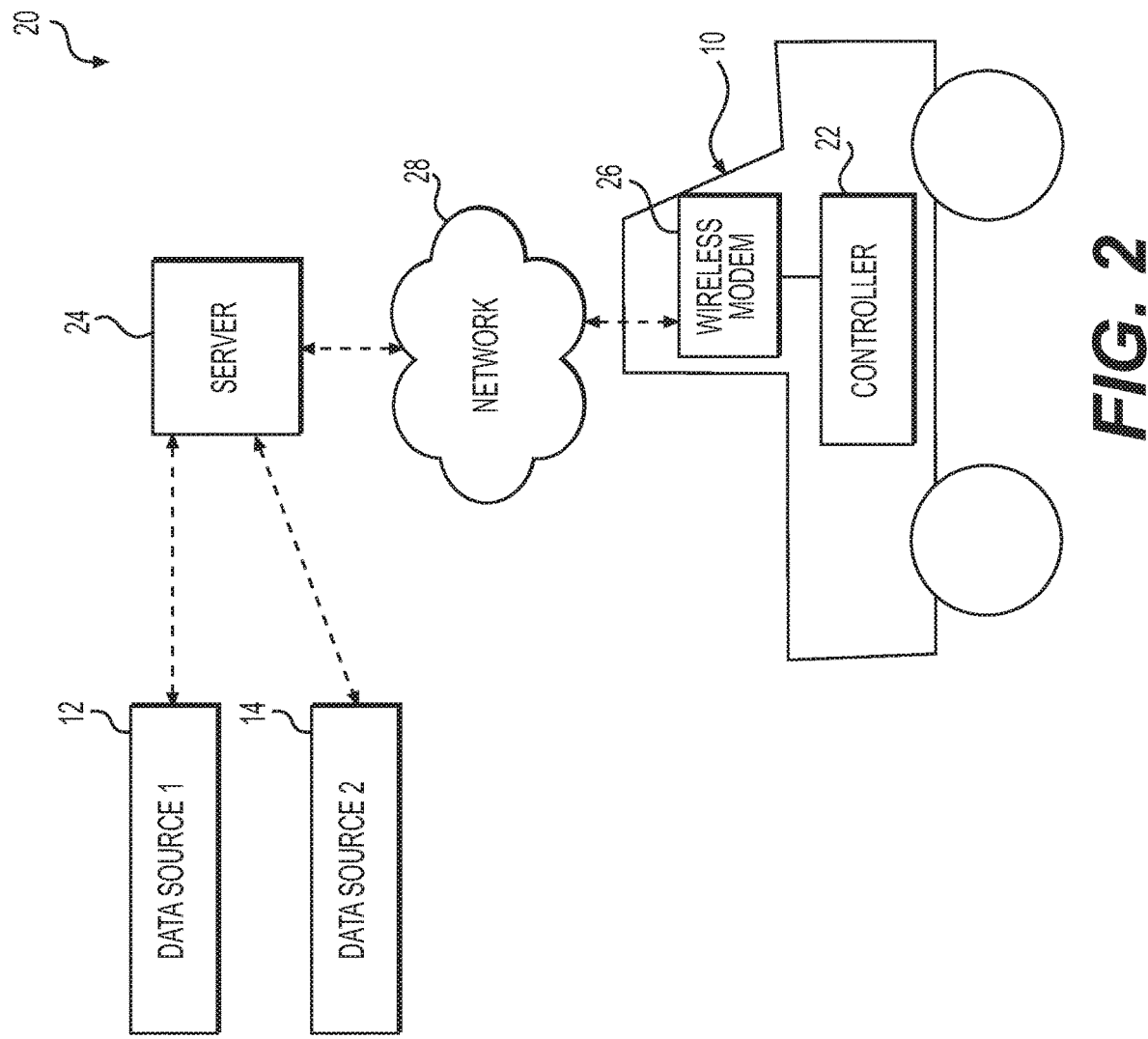

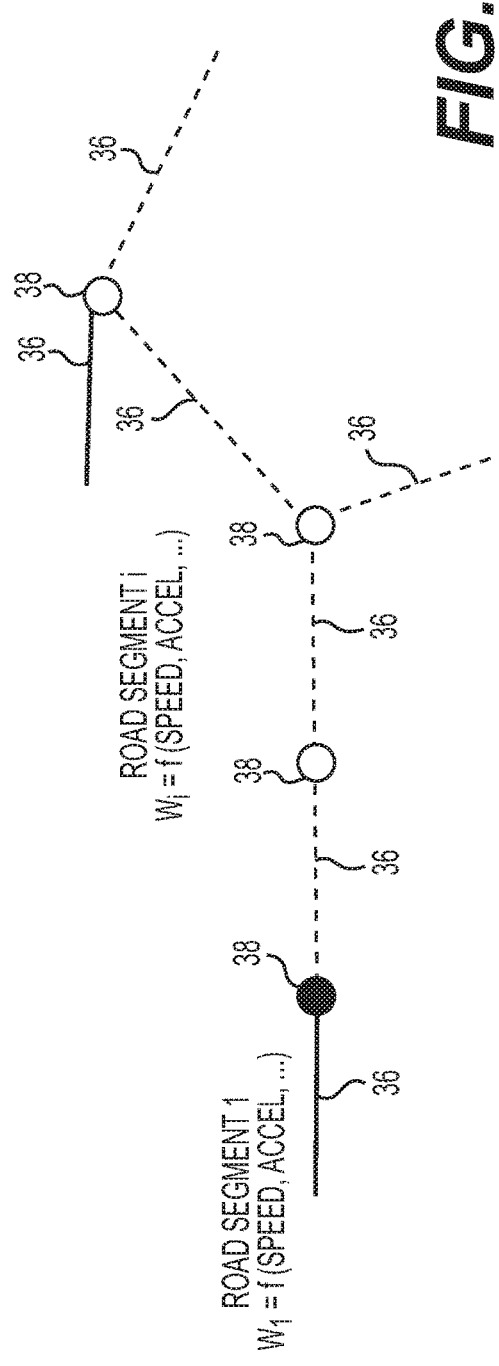
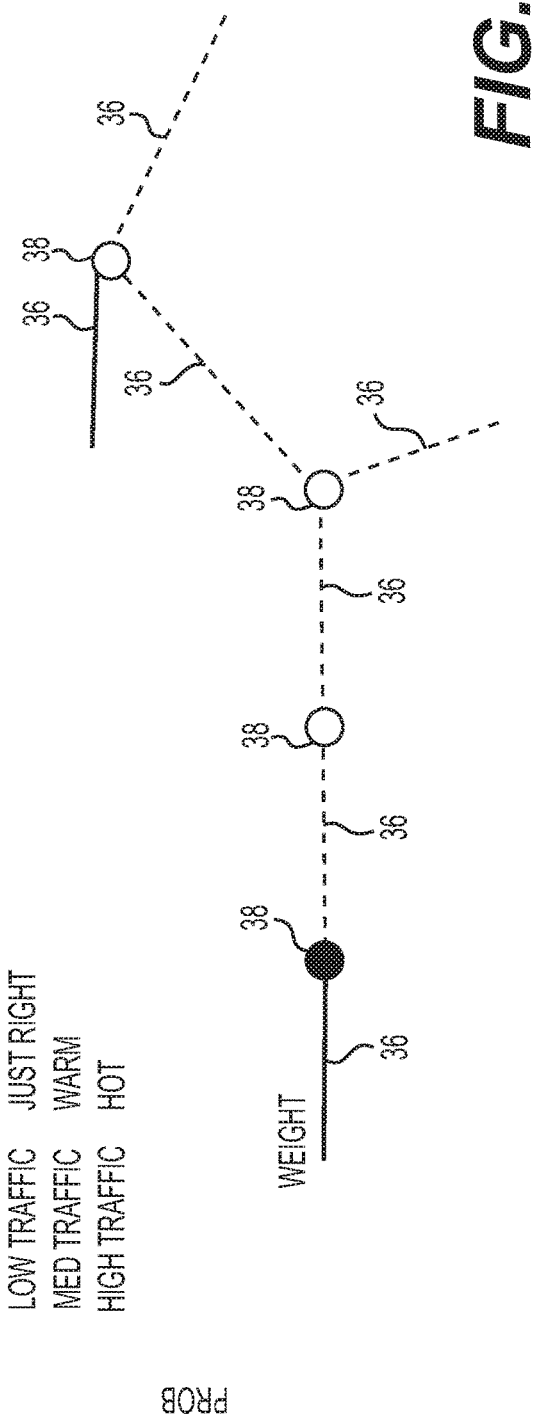

SYSTEM AND METHOD FOR VEHICLE ROUTING USING BIG-DATA

CROSS-REFERENCE TO RELATED APPLICATIONS

This U.S. National Stage Patent Application claims the benefit of PCT International Patent Application Serial No. PCT/US2019/061244 filed Nov. 13, 2019 entitled "SYSTEM AND METHOD FOR VEHICLE ROUTING USING BIG-DATA" which claims the benefit of and priority to U.S. Provisional Patent Application Ser. No. 62/760,574, filed on Nov. 13, 2018, titled "System and Method for Vehicle Routing Using Big Data," the entire disclosures of which are hereby incorporated by reference.

FIELD

The present disclosure relates generally to determining optimal routing paths for a vehicle to travel between an origin and a destination location and which is optimized for both time and fuel or energy required.

BACKGROUND

In recent years, there has been much effort and attention paid to optimizing fuel efficiency of vehicles. There have been some efforts at training users to operate vehicles more efficiently, through training and public service promotions, and the like. Vehicles are driven over a variety of different routes, typically determined by the user/driver based on that person's experience. Users are sometimes assisted by electronic means, such as computerized navigation systems in planning their route. Such computerized navigation systems typically utilize global positioning system (GPS) to determine their precise location in space and are usually configured to provide a route calculated to minimize travel time or travel distance.

SUMMARY

A system for determining an optimal route between an origin and a destination is provided. The system includes a server with a first machine readable storage memory storing a first multivariate probability distribution function (PDF) and a second multivariate probability distribution function (PDF), with the first multivariate probability distribution function mapping a plurality of factors with a time to traverse each of a plurality of road segments, and with the second multivariate probability distribution function mapping a plurality of factors with an energy required to traverse each of the plurality of road segments. The system also includes at least one of the server, and/or a controller in communication with the server being configured to determine the optimal route between the origin and the destination.

In an aspect of the disclosure, the system may include a first data source providing the server with data regarding conditions on the plurality of road segments. In another aspect of the disclosure, the system may also include a second data source providing the server with data regarding actual traversals of road segments within the plurality of road segments.

A first method for determining an optimal route between an origin and a destination is also provided. The first method includes the step of determining a plurality of current features of a plurality of road segments, where the current features include one or more of: traffic conditions, traffic control signal phase and timing (SPaT), speed limits, traffic control signs, road curvature, road conditions, road-specific driving style, weather, and/or temperature. The first method also includes the steps of: estimating an amount of time required to traverse each of the road segments based upon the current features of the road segments and a first multivariate probability distribution function (PDF); and estimating an amount of energy required to traverse each of the road segments based upon the current features of the road segments and a second multivariate probability distribution function. The first method also includes determining a plurality of possible routes between the origin and the destination, with each of the possible routes including one or more of the plurality of road segments; and determining an optimal route for a combination of energy consumption and time as one of the possible routes.

In an aspect of the disclosure, the first method may also include calculating weights for each of the road segments, with each of the weights being dependent upon one or more of: energy consumption, time required to traverse, and/or other features pertaining to the corresponding one of the road segments; and determining a route cost for each of the possible routes, with the route cost being a summation of the weights of all of the road segments within the possible route. In this case, the step of determining the optimal route may be accomplished by determining the one of the possible routes having the lowest route cost. The step of calculating weights for each of the plurality of road segments may include performing a multi-variate stochastic optimization, such as a bi-variate optimization for each of energy consumption and time to traverse the road segments.

In accordance with another aspect of the disclosure, a second method for determining a multivariate probability distribution function of a road segment using historical data from a plurality traversals of the road segment is provided. The second method includes the steps of: assigning a nominal energy consumption value for the road segment based upon a speed profile of the road segment; assigning a nominal traversal time value for the road segment based upon the speed profile of the road segment; and extracting parameter-specific features of the road segment from the historical data. The parameter-specific features of the road segment may include one or more of: a driver-specific feature, a traffic-specific feature, a weather-specific feature, and/or a road-specific feature. The second method also includes identifying each of the parameter-specific features that strongly correspond with energy consumption and/or time to traverse the road segment; and creating the multivariate probability distributions with respect to the parameter-specific features.

In an aspect of the disclosure, the multivariate probability distributions may be provided as variations from one or more of the nominal energy consumption value and/or the nominal traversal time value. The historical data from the traversals of the road segment may be sourced from a plurality of different vehicles. Alternatively or additionally, the historical data from the traversals of the road segment may be sourced from a single vehicle.

In accordance with another aspect of the disclosure, the step of extracting parameter-specific features of the road segment from the historical data may further include: determining a correlation in the historical data between energy consumption and/or traversal time and one or more of: a driver-specific feature, a traffic-specific feature, a weather-specific feature, and/or a road-specific feature of the road segment; the correlation between the parameter-specific feature and energy consumption and/or traversal time may then be used in performing the step of creating the multivariate probability distributions with respect to the parameter-specific features.

BRIEF DESCRIPTION OF THE DRAWINGS

Further details, features and advantages of designs of the invention result from the following description of embodiment examples in reference to the associated drawings.

FIG. 2 is a block diagram of components in a system according to an aspect of the present disclosure;

FIG. 6 is the graph of FIG. 5, illustrating the assignment of weights to each of the road segments, with each of the weights being a function of several factors;

FIG. 7 is the graph of FIG. 5, illustrating an example application of a probability distribution function of traffic condition on one of the road segments;

DETAILED DESCRIPTION

Figure 1:
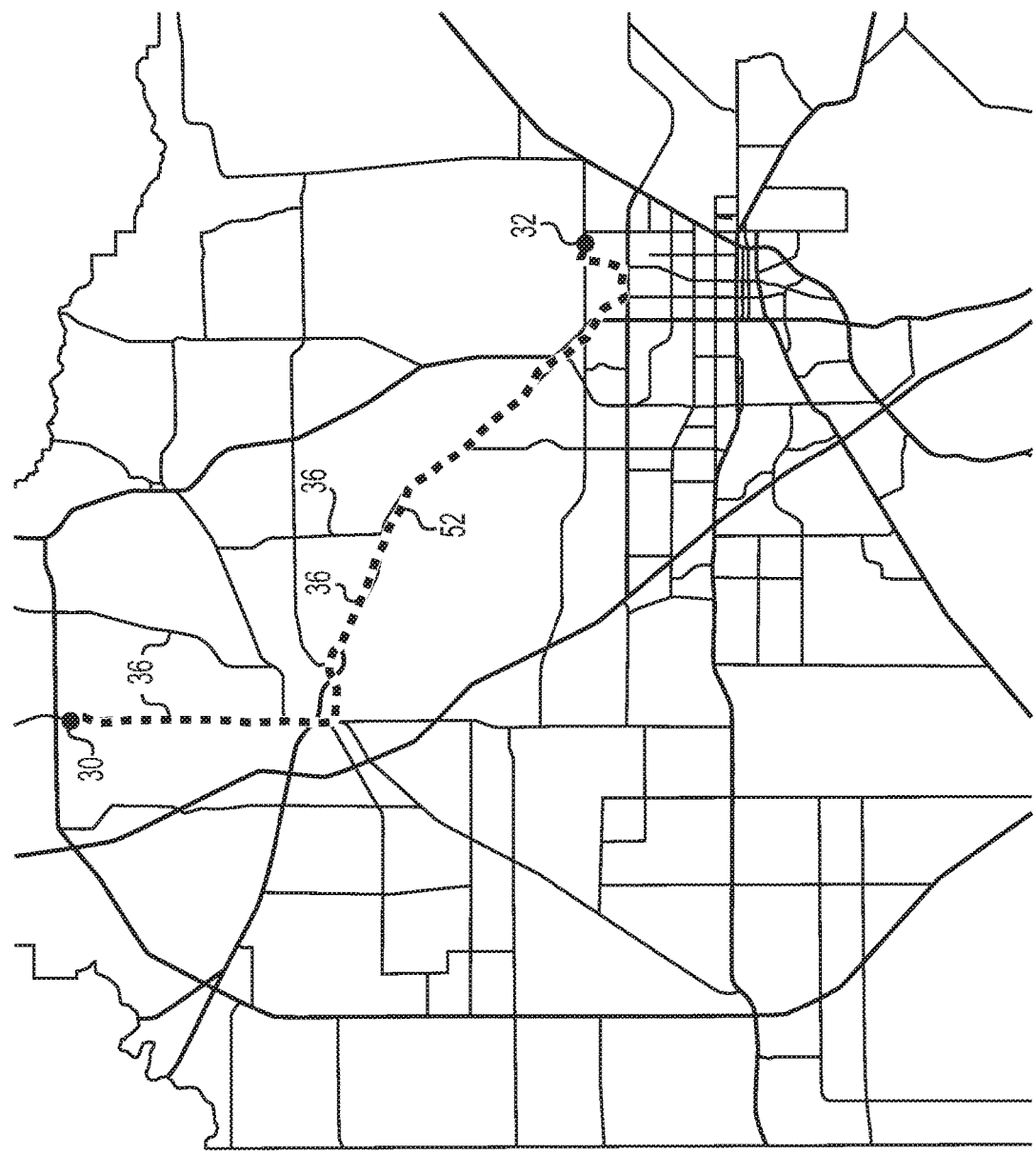
FIG. 1 is a segment of a 2-dimenstional map illustrating a plurality of road segments and with a highlighted route overlaid thereupon.

Recurring features are marked with identical reference numerals in the figures, in which example embodiments of a system and method for determining an optimal route between an origin and a destination is disclosed.

According to an aspect of the disclosure, the system and method can be subdivided into a "Backward Problem" and a "Forward Problem," which are each necessary to determine the optimal route. The "Backward Problem" relates to determining probability distribution functions, each relating impacts of several different factors upon energy consumption, trip time, and user preferences. The "Forward Problem" relates to applying the probability distribution functions using available information on the different factors to determine an optimal route between a given origin and destination. The "Backward Problem" may include creating and maintaining one or more databases containing the probability distribution functions and/or pre-calculated weights based on applications of those probability distribution functions. Those databases, created and maintained through the "Backward Problem," allows solutions to the "Forward Problem" to be obtained in a computationally cost effective manner.

For purposes of this disclosure, the terms "energy consumption" and "fuel consumption" may be used interchangeably and may be used to refer to any energy consumed by a vehicle, including stored electrical energy or energy from a fuel such as gasoline, diesel, compressed natural gas, etc. They may also include energy stored in other mechanical or chemical forms including, for example, in a battery, capacitor, flywheel, etc. Similarly, energies required to perform given actions, such as traversing a road segment, may be supplied by any of the ways described above or any other known or unknown device and/or compound.

A system 20 for determining an optimal route 52 between an origin 30 and a destination 32 along one or more road segments 36 is provided. The optimal route 52 is a path that minimizes both energy and time in a bi-variate case. The optimal route 52 may be a path that minimizes multiple different objectives in a multi-variate case. Objectives to be optimized in a multi-variate case may include, for example, life of vehicle components, vehicle safety, the environmental impact, and/or which route is the best for scenery or proximity to nature (e.g. proximity to water, best fall colors, number and quality of scenic overlooks). Choosing such an optimal route 52 is a multi-objective shortest path problem, which has a number of possible solutions that is exponential in the number of nodes 38, and is, therefore, NP hard. Computational time is a key performance criterion.

In an example case, a user may select or rank one or more factors to be optimized in determining the optimal route 52. For example, the system 20 may default to optimizing for travel time, energy consumption, and vehicle service life, but a user may modify those defaults to prioritize a route for best scenery. Such a user-prioritized route may also take the other factors into consideration, but to a lesser extent. In other words, a road segment 36 that is very scenic may be given a higher weight or score and may be more likely to be included in the optimal route 52, even if there are other routing options that provide a faster travel time and/or lower energy consumption.

As illustrated in FIG. 2, the system 20 may include a controller 22 disposed within a vehicle 10 and configured to determine the optimal route 52 between the origin 30 and the destination 32. Alternatively or additionally, the optimal route 52 may be determined externally, such as by a server 24, and communicated to the controller 22. A wireless modem 26 is disposed within the vehicle 10 and enables the controller 22 to communicate with a server 24 via a communications network 28. The communications network 28 may include one or more of: the internet, a local area network, and/or one or more other networks such as those from a cellular data provider. Alternatively or additionally, the communications network 28 may include peer-to-peer capabilities.

The system 20 also includes a first data source 12 providing the server 24 with data regarding current and/or future conditions on a plurality of road segments 36. The first data source 12 may, for example, provide data regarding weather, traffic and/or mapping data such as the length, slope, direction, and speed limit for each of the road segments 36 or proximity to water bodies, current vegetation, colors around the roads, etc. The first data source 12 may also provide the road type for each of the road segments 36, for example, whether it is a residential street, freeway, highway, etc., and/or whether it is paved or not. The first data source 12, may include, for example, historical or real-time data collected by one or more sensors, such as cameras on vehicles. For example, the first data source 12 may include hardware and/or software that performs an integration of colors visible to a camera on the vehicle to determine how well those colors match predetermined color signatures indicative of highly scenic road segments (e.g., scenic fall colors, water views, etc.). As another example, the first data source 12 may include hardware and/or software that obtains road conditions such as friction coefficient, and/or number and severity of potholes. Such information may be obtained from existing sensors or controllers in a vehicle, such as those used for suspension and/or traction control.

Figure 3:
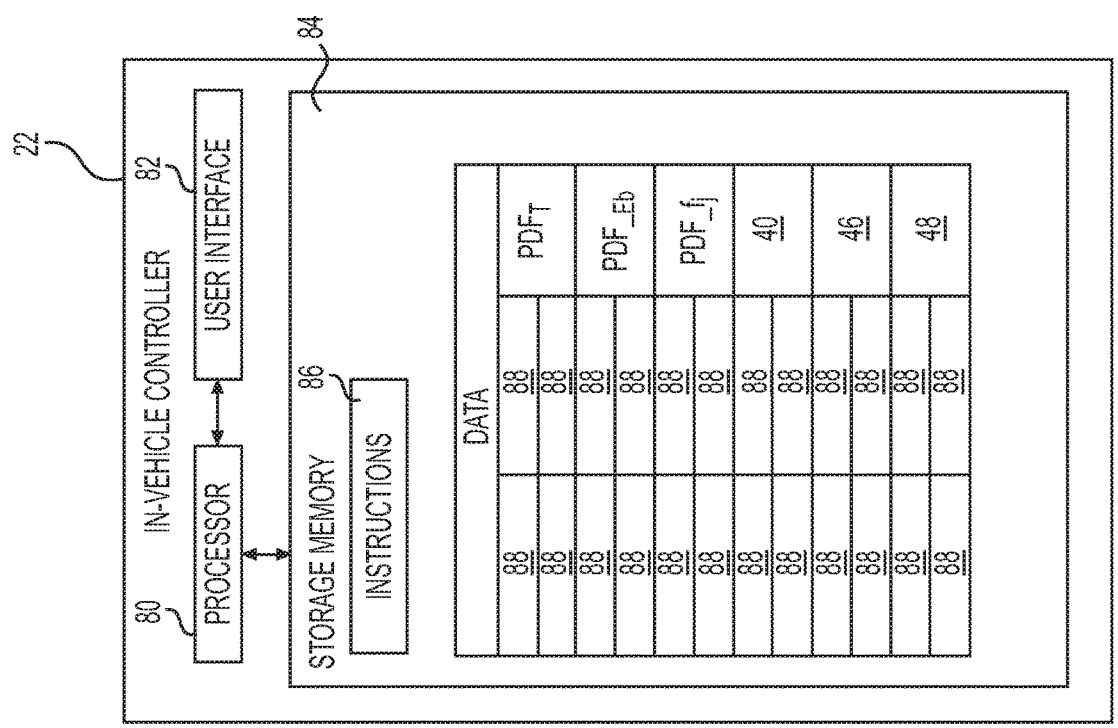
FIG. 3 is a schematic diagram of an in-vehicle controller according to an aspect of the present disclosure.

The system 20 also includes a second data source 14, which may be separate from or combined with the first data source 12, and which provides the server 24 with data regarding actual traversals of the plurality of road segments 36. The second data source 14 may provide real-time or historical actual speeds, positions, etc. from one or more vehicles traveling on the plurality of road segments 36. The second data source 14 may provide telemetry data collected from vehicles traversing the plurality of road segments 36. The second data source 14 may be associated with a fleet management or other vehicle-related service, including As shown in FIG. 3, the in-vehicle controller 22 includes a first processor 80 and a user interface 82, which may be configured to receive the origin 30 and/or the destination 32 from the user. The user interface 82 may also be configured to communicate directions to the user regarding the optimal route 52. The user interface 82 may include visual or audio output devices such as display screens, head-up displays, indicator lights, tones, chimes, and/or voice prompts. The user interface 82 may also include one or more user input devices such as, for example, a touchscreen, keyboard, mouse, trackpad, etc. The in-vehicle controller 22 also includes a first machine readable storage memory 84. The first machine readable storage memory 84 may include one or more types of memory including, for example, RAM, ROM, optical, magnetic, and flash-based memory. The first machine readable storage memory 84 may store first instructions 86, which may take the form of an executable program or script, and which may be compiled, interpreted, or otherwise run by the first processor 80 and/or another device to cause some action or data manipulation to be undertaken. The first machine readable storage memory 84 may also store a plurality of first data entries 88, which may include data related to routing the vehicle 10, such as location data, and data regarding the roads, the vehicle, and/or the driver.

Figure 4:
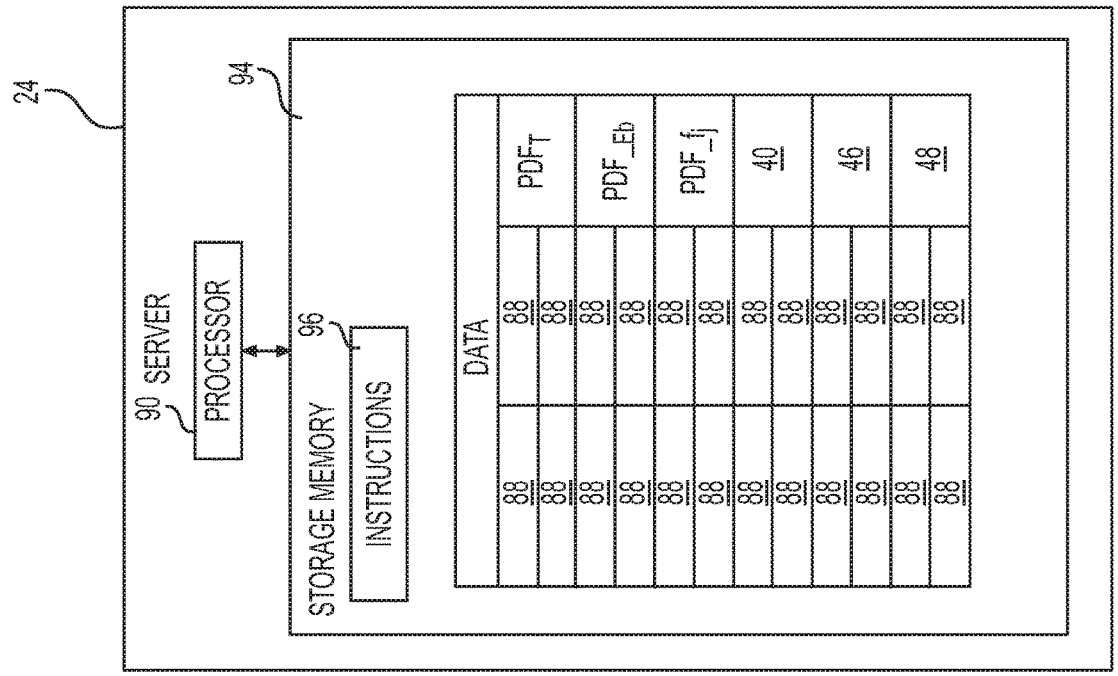
FIG. 4 is a schematic diagram of a server computer according to an aspect of the present disclosure.

As shown in FIG. 4, the server 24 includes a second processor 90 and a second machine readable storage memory 94. The second machine readable storage memory 94 may include one or more types of memory including, for example, RAM, ROM, optical, magnetic, and flash-based memory. The second machine readable storage memory 94 may store second instructions 96, which may take the form of an executable program or script, and which may be compiled, interpreted, or otherwise run by the second processor 90 and/or another device to cause some action or data manipulation to be undertaken. The second machine readable storage memory 94 may also store a plurality of second data entries 98, which may include data related to routing vehicles. The second data entries 98 may include, for example, data regarding previous traversals of a plurality of road segments 36.

One or both of the first storage memory 84 of the in-vehicle controller 22 and/or the second storage memory 84 in the server 24 may store a first multivariate probability distribution function (PDF) $PDF_T$ and a second multivariate probability distribution function (PDF) $PDF\_E_b$, with the first multivariate probability distribution function $PDF_T$ mapping a plurality of factors with a time T to traverse each of a plurality of road segments 36, and with the second multivariate probability distribution function $PDF\_E_b$ mapping a plurality of factors with an energy E required to traverse each of the plurality of road segments 36. In general, other factors j can be included and the PDF for any such factor can be labeled $PDF\_f_j$ for a $j^{th}$ factor, where $j \in \{1, \ldots n\}$ for n features. These multivariate PDFs $PDF_T$, $PDF\_E_b$, $PDF\_f_j$, may be determined, for example, using the data regarding previous traversals of the plurality of road segments 36 as stored in the second data entries 98 on the server 24.

Figure 5:
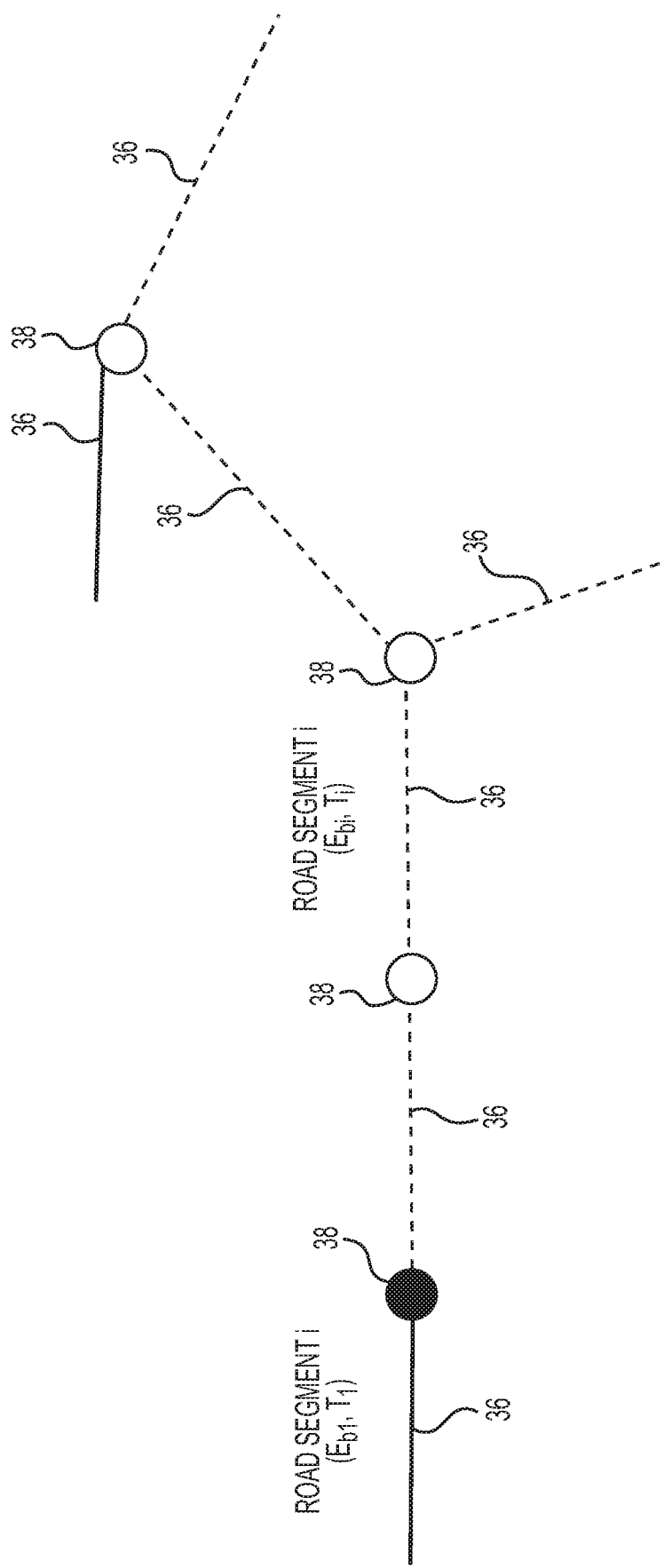
FIG. 5 is a graph showing a plurality of road segments, each connected by nodes and each having a segment energy value and a segment time value associated therewith.

As shown in FIG. 5, a plurality of road segments 36, connected by nodes 38 are each assigned corresponding energy $E_{bi}$ and time $T_i$ values, and $f_j$ feature values where i is an index number identifying a given one of the road segments 36. As shown in FIG. 6, each of the road segments 36 may be assigned a weight $W_i$, which is a function of speed, acceleration, and other factors expected to be encountered as the vehicle 10 traverses those road segments. The weight assignment may utilize travel information derived from GPS or fleet testing along with fuel consumption characteristics of the vehicle 10. Various empirical models may be used to assign the weights $W_i$ based on data. Speed/acceleration data from GPS, partial actual fuel consumption data, or information gathered as the vehicle 10 traverses other road segments 36, may be used in calculating the weights $W_i$. Other factors such as road topology, weather, specifications of the vehicle 10, etc. may be used in calculating the weights $W_i$.

As shown in FIG. 7, the weights $W_i$, of each of the road segments 36 may have probability distribution functions $PDF_T$, $PDF\_E_b$, $PDF\_f_j$ associated therewith that map the probability of impacts to those weights $W_i$ based on one or more factors. In the example shown on FIG. 7, the factor illustrated is a traffic volume (Low Traffic/Med. traffic/High traffic). A Simple-static-deterministic approach may be applied for determining the impacts of the factors on the weights W. However, a complex-dynamic-probabilistic approach may be most accurate. Using a deterministic approach, the energy E or fuel consumption may be assumed to fixed, or directly proportionate to the time interval. Using a complex approach, the energy E or fuel consumption may be modeled as a function of time. A static approach may be used, in which historical data is used to assign the weights $W_i$, which then remain fixed. Alternatively, a dynamic approach may be used in which the weights $W_i$ are updated based on real-time data. A deterministic approach may be employed, in which the weights $W_i$ remain constant. Alternatively, a probabilistic approach may be employed, in which the weights $W_i$ are a distribution.

Information from one or more large sources, which may be called "Big Data" may a source for values associated with the factors used to determine the probability distribution functions $PDF_T$, $PDF\_E_b$, $PDF\_f_j$, and ultimately, the weights $W_i$ for the road segments 36. Such Big Data sources may be used for the data sources 12, 14, described above, and may come from one or more commercial or non-commercial may data providers, such as Google, Tomtom, Here Technologies, Waze, and/or government sources. Such big Data sources may include one or more commercial carriers, including, for example, UPS, Federal Express, Lyft, Uber, taxi companies, food delivery companies, or a data aggregation company such as Geotab. Either or both of the data sources 12, 14 may provide regularly-updated data. The factors provided may include road data including road surface type, elevation, curvature, road quality, coefficient of friction, etc. Actual trip data may include speed data updated at least 1 Hz, vehicle specifications, origin/destination, time/date, location, etc. The data sources 12, 14 may provide measured telemetry data such as fuel consumption, ambient temperature, etc.

Figure 8:
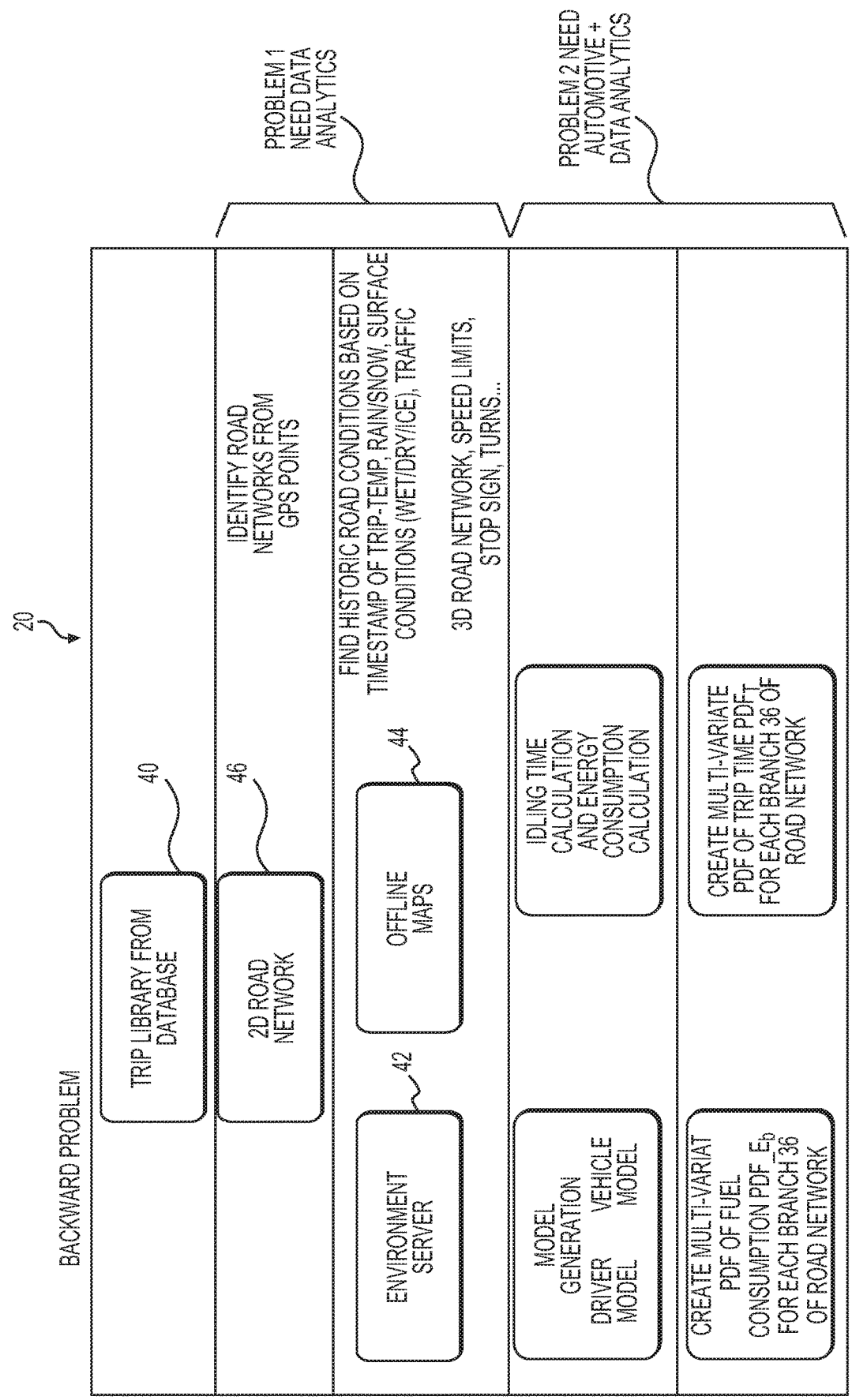
FIG. 8 is a block diagram illustrating a framework for solving a "Backward Problem" to determine probability distribution functions relating impacts of several different factors upon fuel consumption and trip time.

FIG. 8 is a block diagram for a portion of the system 20 to solve the "backward problem" of creating the multivariate probability distribution functions (PDFs) for each of trip time and energy or fuel consumption, $PDF_T$, and $PDF\_E_b$, respectively, for each of the road segments 36. As shown in FIG. 8, a route, or trip may be stored in a trip database 40, which may have predetermined PDFs $PDF_T$, $PDF\_E_b$, $PDF\_f_j$. The trip database may be stored in either or both of the in-vehicle controller 22, and/or the server 24. The backward problem can be subdivided into a first problem 1 of map generation, and a second problem 2 of PDF generation.

The first problem 1 may require data analytics and may include identifying a 2-dimensional road network from GPS points. Solving the first problem 1 may include finding historic road conditions based on timestamps of trips over road segments 36 in that trip, and correlating the position and time data with known conditions, such as temperature, precipitation, surface conditions (e.g., wet/dry/ice), and information regarding the 3-dimensional road network, including for example, speed limits, turns, and traffic control devices. This may be accomplished using an environment server 42, which is a remote source of environmental data, and/or offline maps 44, which may include local copies of the environmental data saved in the first storage memory 84 of the in-vehicle controller 22.

The second problem 2 may require data analytics regarding one or more vehicles and one or more drivers. Solving the second problem 2 may include generating one or models of how the driver and/or the vehicle affects the time and energy required to traverse each of the road segments 36, and how each of those is impacted by specific conditions and factors such as weather, time of day, available light, road condition and type, etc. Solving the second problem Problem 2 may also include calculating the amount of time that the vehicle 10 is likely to spend idling as it traverses the road segments 36, and the amount of time and energy required to do so.

Figure 9:
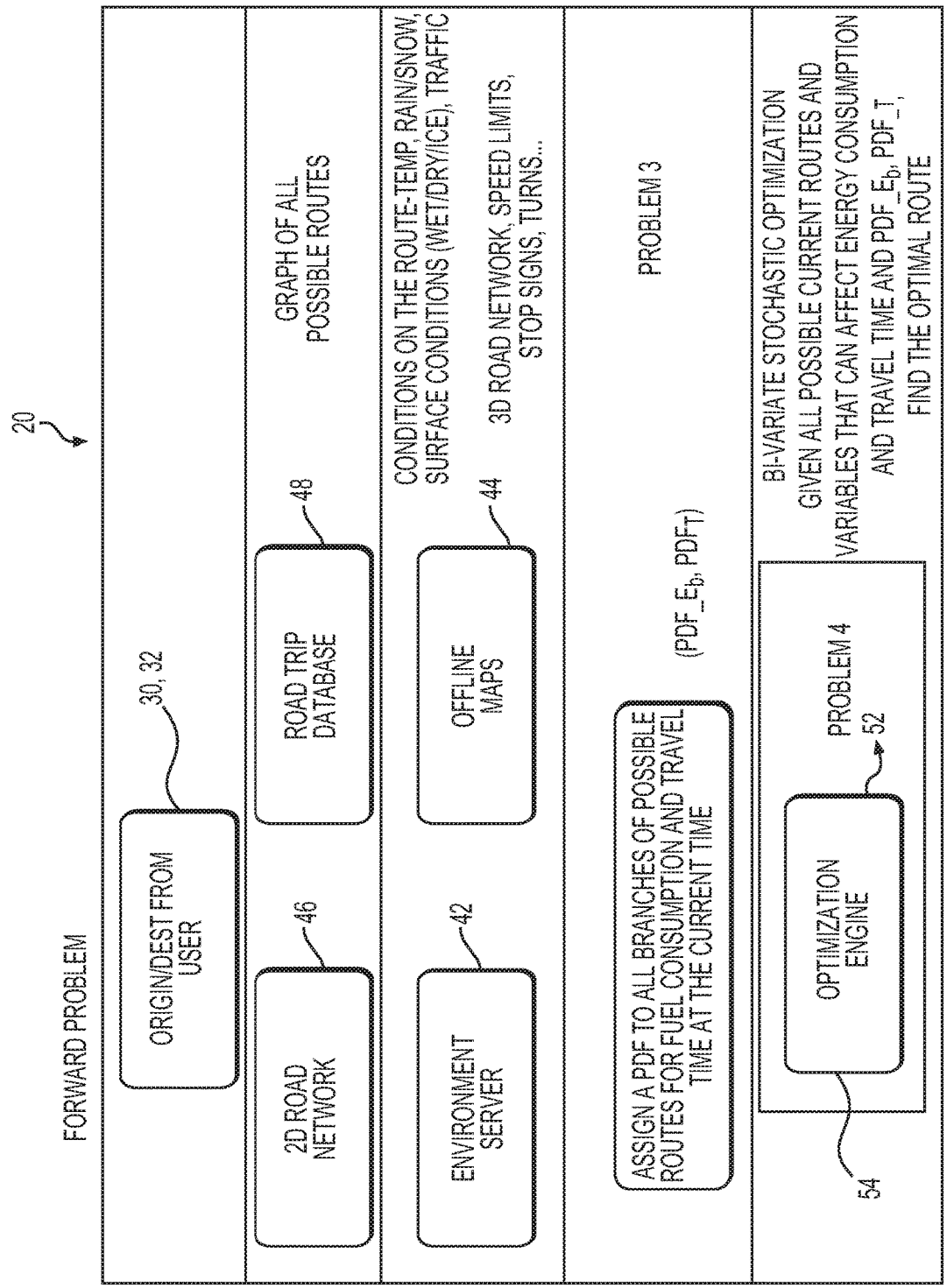
FIG. 9 is a block diagram illustrating a framework for solving a "Forward Problem" to apply the probability distribution functions relating impacts of several different factors upon fuel consumption and trip time in order to determine an optimal route between a given origin and destination.

FIG. 9 is a block diagram for a portion of the system 20 to solve the "forward problem" applying the multivariate probability distribution functions (PDFs) for each of trip time and energy or fuel consumption, $PDF_T$, and $PDF\_E_b$, in order to determine an optimal route 52 between an origin 30 and a destination 32. This includes receiving the origin 30 and designation 32 from the user, which may be done via the user interface 82. The system 20 includes hardware and/or software configured to graph all possible or plausible routes between the origin 30 and the destination 32. Plausible routes are a subset of the possible routes, but excluding counterproductive portions such as backtracking, circular routing, etc. This hardware and/or software may include a 2-dimensional road network 46 and/or a road trip database 48, which may each be stored in the storage memory of one or both of the in-vehicle controller 22 and/or a server 24. Conditions on the road are matched with the road segments 36 in the possible routes by may be accomplished using an environment server 42, which is a remote source of environmental data, and/or offline maps 44, which may include local copies of the environmental data saved in the first storage memory 84 of the in-vehicle controller 22. The forward problem can be subdivided into a third problem Problem 3 of PDF assignment, and a fourth problem Problem 4 of route optimization.

In the third problem Problem 3 of PDF assignment, a probability distribution function is assigned to all branches of possible routes at the current time for each of trip time and energy or fuel consumption, $PDF_T$, and $PDF\_E_b$, respectively. In the fourth problem Problem 4 of route optimization, a bi-variate stochastic optimization is used by an optimization engine 54 to calculate an optimal route 52 from the plurality of possible or plausible routes determined earlier. The optimization engine 54 may be a software routine and may be located in and executed by a processor 80, 90 one or more of the in-vehicle controller 22, a server 24, or a combination thereof.

Figure 10:
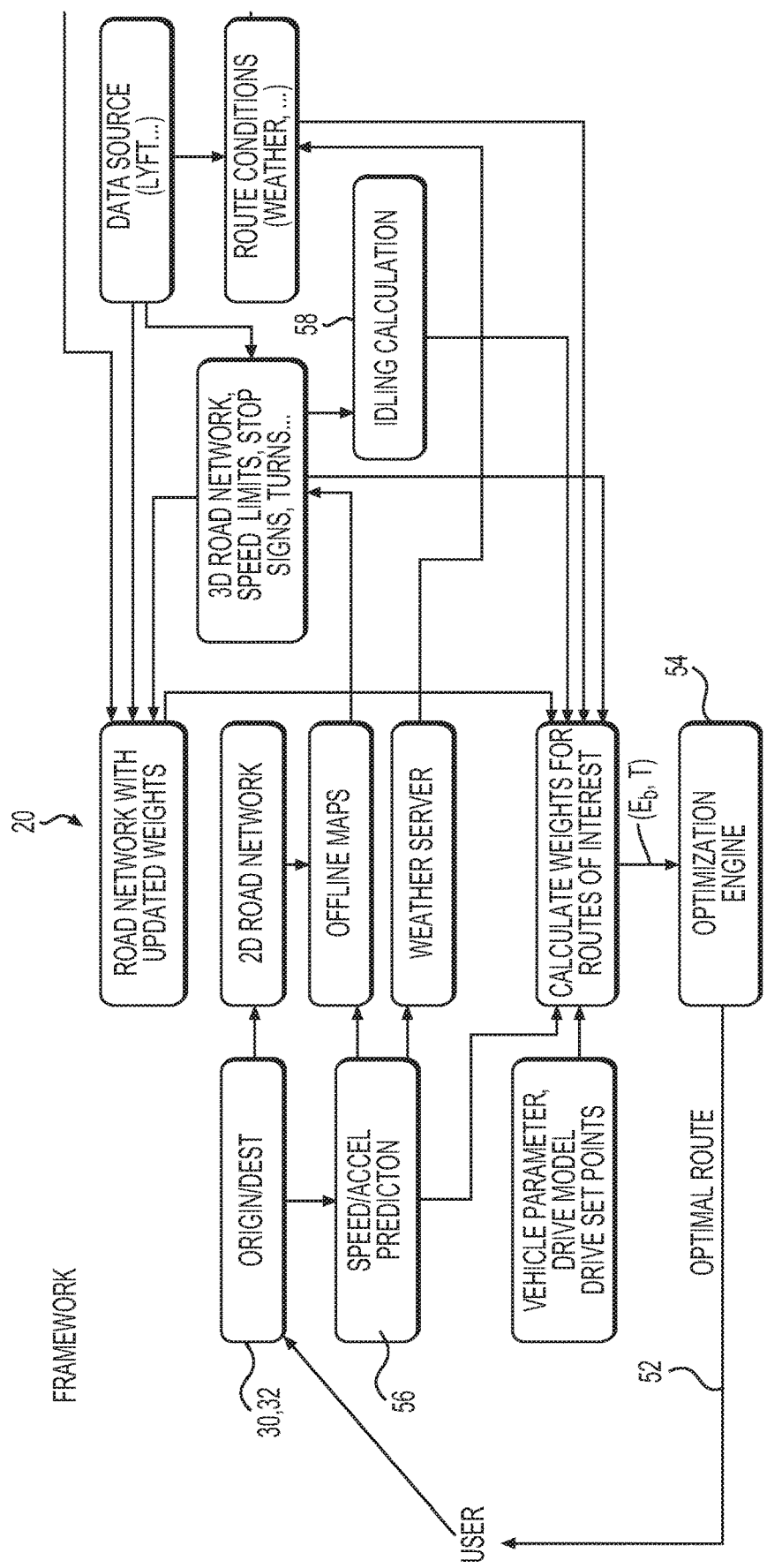
FIG. 10 is a schematic framework diagram of a system for gathering and processing data to determine an optimal route between an origin and a destination location.

A summary schematic framework diagram of how the system 20 determines an optimal route 52 is outlined in FIG. 10. In that framework, the optimization engine 54 provides an optimal route 52, which is presented to the user. The optimization engine 54 takes a number of inputs including: predicted speed and acceleration from a speed/acceleration prediction block 56; and vehicle parameters, driver model, and driver set points. Those driver and vehicle parameters may be provided by the driver and/or the vehicle manufacturer, and/or they may be determined empirically using historical data regarding the driver and/or the vehicle. The optimization engine 54 may take additional inputs including: updated weights $W_i$ regarding the road segments 36 in a road network; an estimated idling time from an idling calculation block 58; route conditions including weather and other factors; and 3-dimensional data regarding the road segments 36 in the road network.

Figure 11A:
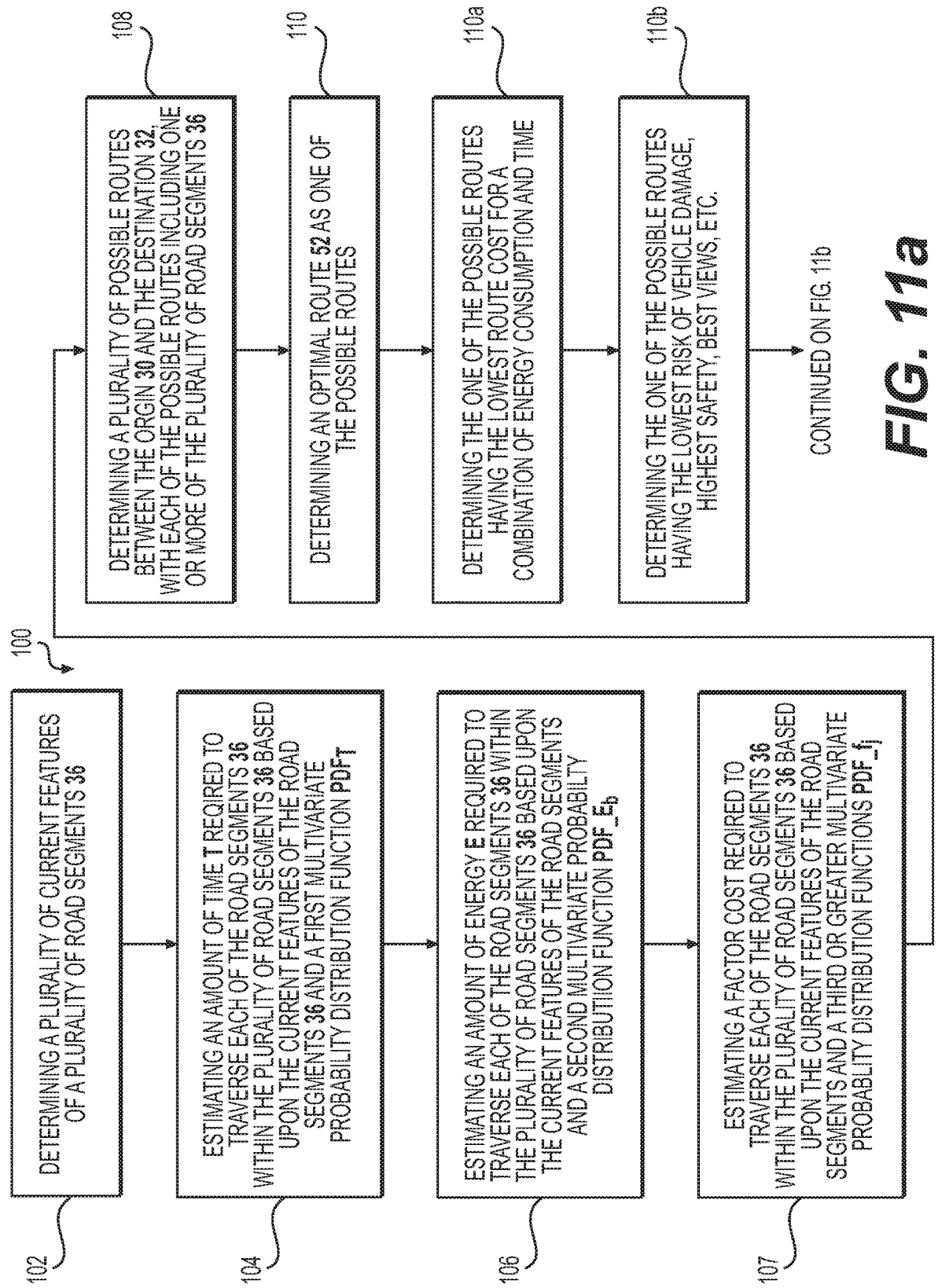
FIG. 11A is a flow chart of steps in an exemplary first method for solving the forward problem.
Figure 11B:
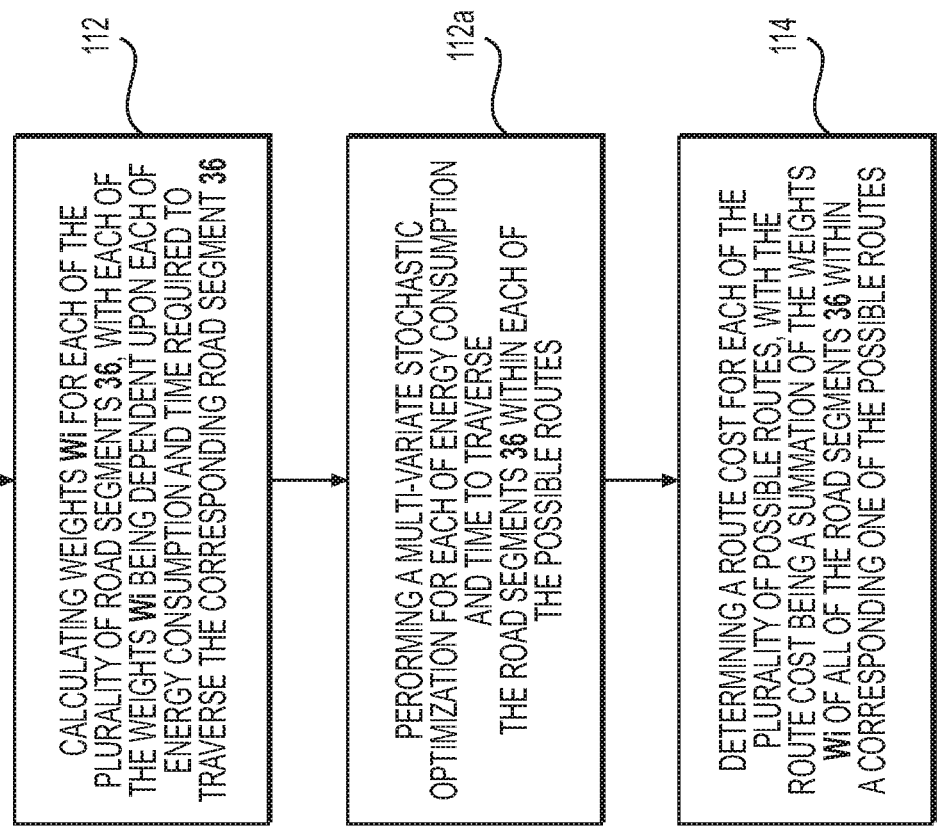
FIG. 11B is a continuation of the flow chart of FIG. 11A.

As described in the flow charts of FIG. 11, a first method 100 is provided for determining an optimal route between an origin 30 and a destination 32. This first method 100 may also be called a "forward" method or an approach to solving a "forward problem".

The first method 100 includes the step of 102 determining a plurality of current features of a plurality of road segments 36. The current features may include one or more of: traffic conditions, traffic control signal phase and timing (SPaT), speed limits, traffic control signs, road curvature, road conditions, and road-specific driving style.

The first method 100 includes the step of 104 estimating an amount of time T required to traverse each of the road segments 36 within the plurality of road segments 36 based upon the current features of the road segments 36 and a first multivariate probability distribution function $PDF_T$.

The first method 100 includes the step of 106 estimating an amount of energy E required to traverse each of the road segments 36 within the plurality of road segments 36 based upon the current features of the road segments and a second multivariate probability distribution function $PDF\_E_b$.

The first method 100 includes the step of 107 estimating a factor cost required to traverse each of the road segments 36 within the plurality of road segments 36 based upon the current features of the road segments and a third or higher number multivariate probability distribution function $PDF\_f_j$ for a $j^{th}$ factor, where $j \in \{1, \ldots n\}$ for n features. Features, or objectives to be optimized may include, for example, life of vehicle components, vehicle safety, the environmental impact, and/or which route is the best for scenery or proximity to nature (e.g. proximity to water, best fall colors, number and quality of scenic overlooks).

The multivariate probability distribution functions (PDFs) $PDF_T$, $PDF\_E_b$, $PDF\_f_j$ may be predetermined and/or dynamically generated based on observed values or on driver-specific or vehicle-specific values or conditions. The multivariate probability distribution functions (PDFs) $PDF_T$, $PDF\_E_b$, $PDF\_f_j$ may provide nominal values, which may be offset based on observed values or on driver-specific or vehicle-specific values or conditions.

The first method 100 also includes 108 determining a plurality of possible routes between the origin 30 and the destination 32, with each of the possible routes including one or more of the plurality of road segments 36. The possible routes preferably include only road segments 36 that could progress toward the destination 32. In other words, the possible routes should not include circular loops or backtracking unless those result from changing conditions, such as a road being closed.

The first method 100 also includes 110 determining an optimal route 52 as one of the possible routes. Specific examples and details of how this step 110 is accomplished is described further below.

The first method 100 may also include 112 calculating weights $W_i$ for each of the plurality of road segments 36, with each of the weights $W_i$ being dependent upon each of energy consumption and time required to traverse the corresponding road segment 36. A graphic example of these weights $W_i$ is shown in the map of FIG. 1. In one example embodiment, the step of calculating 112 weights $W_i$ for each of the plurality of road segments may include 112a performing a bi-variate stochastic optimization for each of energy consumption and time to traverse the road segments 36 within each of the possible routes.

The first method 100 may also include 114 determining a route cost for each of the plurality of possible routes, with the route cost being a summation of the weights $W_i$ of all of the road segments 36 within a corresponding one of the possible routes.

The step of 110 determining the optimal route 52, may therefore include 110a determining one of the possible routes having the lowest route cost for a combination of energy consumption and time. Likewise, step of 110 determining the optimal route 52, may include 110b determining one of the possible routes that is optimized for one or more other features or objectives such as life of vehicle components, vehicle safety, the environmental impact, and/or which route is the best for scenery or proximity to nature. Furthermore, step 110 may include determining the optimal route 52 as multi-variate optimization, optimizing for several different features including, for example, energy consumption, time, life of vehicle components, vehicle safety, available scenery, etc. In other words, the route cost may be calculated to weigh each of several different features, such as combining steps 110a and 110b in a combined optimization. The optimal route 52 may then be selected as the one of the one of the possible routes with the lowest route cost.

Figure 12:
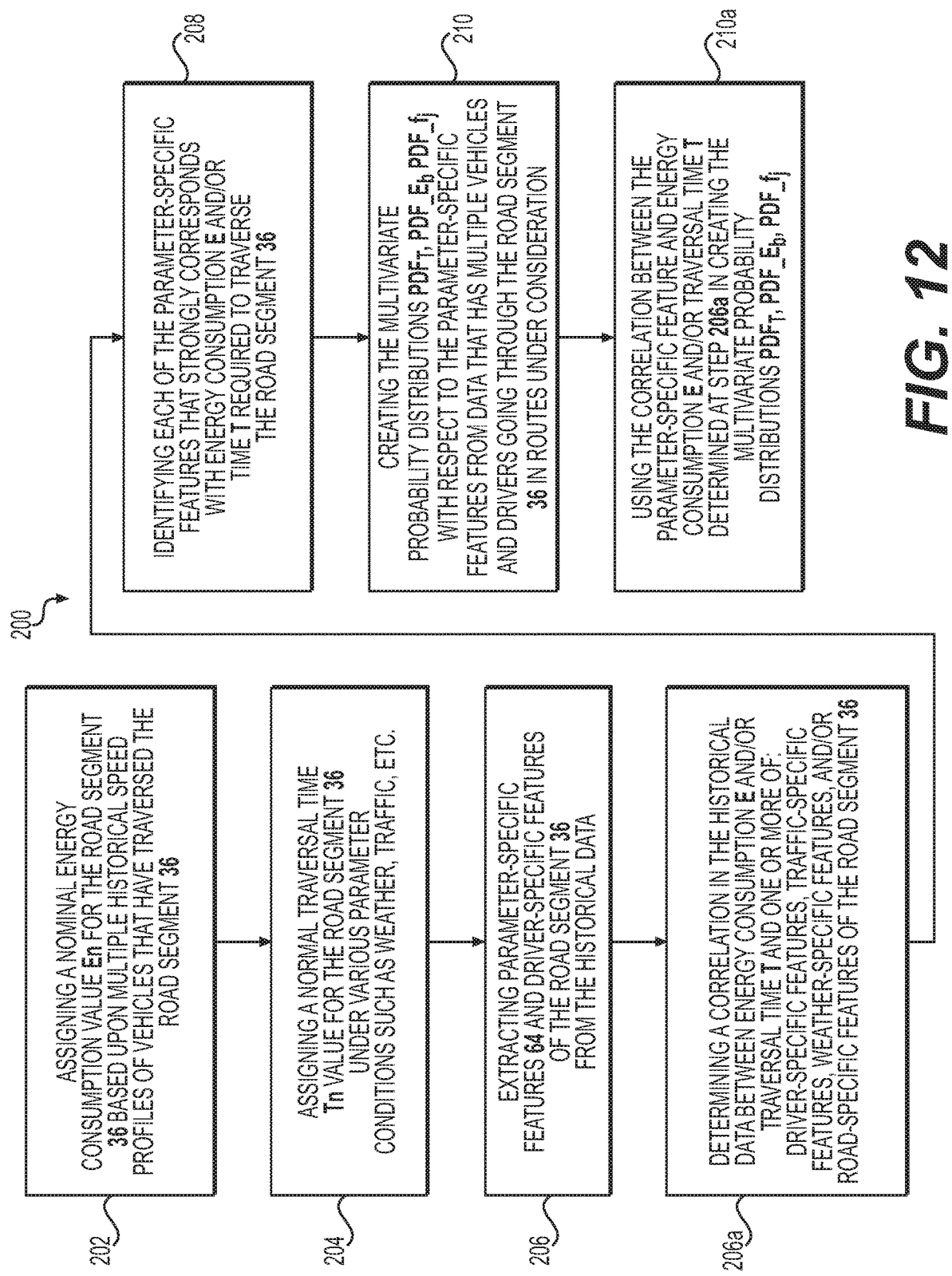
FIG. 12 is a flow chart of steps in an exemplary second method for solving the backward problem.

As described in the flow charts of FIG. 12, a second method 200 is provided for determining a multivariate probability distribution function $PDF_T$, $PDF\_E_b$, $PDF\_f_j$ of a road segment 36 using historical data recorded from one or more traversals of the road segment 36.

The second method 200 may include 202 assigning a nominal energy consumption value $E_n$ for the road segment 36 based upon multiple historical speed profiles of vehicles that have traversed the road segment 36. The speed profile may include data regarding typical ranges of speeds for vehicles traversing the road segment 36. It may also include data on how vehicle speeds are impacted by factors such as traffic or weather. The nominal energy consumption value $E_n$ may be based upon other factors including, for example, length, average slope or altitude change, terrain or road type, etc.

The second method 200 may also include 204 assigning a nominal traversal time $T_n$ value for the road segment 36 under various parameter conditions such as weather, traffic, etc. This step may be performed similarly to step 202, but with different operating parameters.

The second method 200 may also include 206 extracting parameter-specific features and driver-specific features of the road segment 36 from the historical data. The parameter-specific features of the road segment 36 may include one or more traffic-specific features, weather-specific features, and/or road-specific features. The driver-specific features may include features that vary depending on, for example, driving style and/or driver preferences. In other words, one or more parameter-specific features may be isolated for its correlation to a measurable value such as instantaneous speed, average speed, energy consumption, etc.

The second method 200 may also include 208 identifying each of the parameter-specific features that strongly corresponds with at least one of: energy consumption E, time T required to traverse the road segment 36, and/or other factors j pertaining to the road segment 36. A strong correspondence may be a correspondence or correlation that is greater than some threshold value. Alternatively or additionally, a given parameter-specific feature may be designated as having a strong correspondence as a result of having a correlation value with energy consumption E and/or time T required to traverse the road segment 36 that is higher than correlation values of other factors pertaining to the road segment 36. For example, one or more of the parameter-specific features having the highest correlation to energy consumption E or time T required to traverse the road segment 36 may be designated as having a strong correspondence with the corresponding one of energy consumption E or time T required to traverse the road segment 36.

The second method 200 may also include 210 creating the multivariate probability distributions $PDF_T$, $PDF\_E_b$, $PDF\_f_i$ with respect to the parameter-specific features from data derived from multiple vehicles and multiple drivers going through the road segments 36 within routes under consideration. This step 210 includes determining probability functions that relate two or more of the parameter-specific features with resulting traversal times T and or energy requirements E. For example, adverse weather and high traffic volumes may result in a higher probability of vehicle accidents, which may compound the likelihood of an increased traversal time T beyond what would be expected from either of the weather or traffic volume, standing alone.

In one embodiment, the multivariate probability distributions $PDF_T$, $PDF\_E_b$, $PDF\_f_i$ may be provided as variations from one or more nominal values, such as the nominal energy consumption value $E_n$ and/or the nominal traversal time value $T_n$. Alternatively, the multivariate probability distributions $PDF_T$, $PDF\_E_b$, $PDF\_f_j$ may be provided as an absolute value, such as an energy consumption value $E_a$ and/or an absolute traversal time value $T_a$ for the road segment 36.

According to an aspect, the historical data may be gathered a plurality of different vehicles. For example, it may come from a distributed system, such as from monitoring many vehicles within a fleet and/or from a survey using many different vehicles over time. Alternatively or additionally, the historical data may be gathered from a plurality traversals of the road segment by a single vehicle. For example, the historical data may use only or primarily data from the subject vehicle. This may be advantageous for a vehicle 10 that regularly travels a given route, such as a daily commute.

According to an aspect, the step of 206 extracting parameter-specific features of the road segment 36 from the historical data may further include: 206a determining a correlation in the historical data between one or both of energy consumption E and/or traversal time T and one or more of: a driver-specific feature, a traffic-specific feature, a weather-specific feature, and/or a road-specific feature of the road segment 36.

According to a further aspect, the step of 210 creating the multivariate probability distributions with respect to the parameter-specific features includes 210a using the correlation between the parameter-specific feature and energy consumption E and/or traversal time T determined at step 206a.

Two main approaches are provided for determining energy consumption E for the vehicle to traverse a given road segment 36 or a route containing one or more road segments 36. The first approach is physics-based, and the second approach is data-based, using actual measured data to model the energy consumption E. This approach may include an AI-based approach, for example, where Neural Networks and/or other systems or methods are used to predict the energy consumption E.

In the first or physics-based approach, the energy needed to traverse a route should be calculated to include the energy needed to move the vehicle 10 along the route, any energy needed to accelerate/decelerate, and idle. It should also take into account any energy that may be recovered by braking. The first approach should include finding and including the energy needed to heat and/or cool the vehicle, and to support other accessories. Driver preferences may play an important role in this aspect. For example, a driver's preferred temperature setting may have a large impact on the HVAC heating or cooling energy required. A challenge in this approach is to predict the acceleration profile, as it may depend strongly upon driving style and factors such as road conditions and/or weather. The idling time may be modeled as a probability distribution to determine likely lengths of time that the vehicle 10 may have to idle along the route, for example, while waiting for traffic control signals.

The first approach may include determining a total energy required, which may be determined as described below, with reference to formulas 1-6. According to an aspect, a force demand at the wheels of the vehicle $F_w$, may be determined by Formula 1, below, where m is the mass of the vehicle, v is the velocity of the vehicle, t is time, and $\alpha(x)$ is slope of the road as a function of the position, x.

$$F_w = m\dot{v}(t) + a_2 v(t)^2 + a_1 v(t) + a_0 + mg \sin(\alpha(x)) \quad \text{Formula 1}$$

The torque $T_m$ required to meet the force demand Fw may be determined by Formula 2, below, where r is the radius of the wheels, $\rho_t$ and $\eta_t$ are the transmission ratio and efficiency, respectively.

$$T_m = \begin{cases} \dfrac{F_w r}{\rho_t \eta_t}, & \text{if } F_w \geq 0 \\ \dfrac{F_w r \eta_t}{\rho_t}, & \text{if } F_w < 0 \end{cases} \quad \text{Formula 2}$$

The power available from regenerative braking, $P_m$ is given by Formula 3, below, where $T_m$ is the torque requested of the motor, and $T_{m,max}$ and $T_{m,min}$ are the maximum and the minimum torques of the motor, respectively, and where $\omega(t)$ is the motor rotational regime, given by Formula 4, below.

$$P_m = \begin{cases} T_{m,max} \cdot \omega(t), & \text{if } T_m \geq T_{m,max} \\ T_m \cdot \omega(t), & \text{if } T_{m,min} < T_m < T_{m,max} \\ T_{m,min} \cdot \omega(t), & \text{if } T_m \leq T_{m,min} \end{cases} \quad \text{Formula 3}$$

$$\omega(t) = \frac{v(t)\rho_t}{r} \quad \text{Formula 4}$$

The power demand $P_b$ from the vehicle is given by Formula 5, below, where $\eta_b$ is the powertrain overall efficiency. The total energy required from a battery $E_b$ to propel the vehicle over a travel time T is given by Formula 6, below.

$$P_b = \begin{cases} \dfrac{P_m}{\eta_b}, & \text{if } P_m \geq 0 \\ P_m \eta_b, & \text{if } P_m < 0 \end{cases} \quad \text{Formula 5}$$

$$E_b = \int_0^T P_b \, dt \quad \text{Formula 6}$$

In the second, or data-based approach, the energy needed to traverse a route may be determined using an empirical formulation of energy consumption given a statistical description of the route. The statistical description of the route may include one or more of a range of speeds traveled along the route, a number of turns, types of turns, average speed, average acceleration, etc. The data-based approach should calibrate for or take into account details of the vehicle and/or the driver. The data-based approach may use, for example, the tractive force generated by the vehicle, which may be calculated as provided in formulas 7-8, below.

For vehicles directly powered by a fuel, such as gasoline, the fuel consumption rate $f_t$ (gal./s) may be determined by Formula 7, below, where $\alpha$, $\beta$, $\gamma$, $\delta$, $\zeta$, and $\alpha'$ are vehicle-specific model parameters, and where $P_{tract}$ is the tractive power being applied by the vehicle at any given time. $P_{tract}$ may be calculated by Formula 8, below, where A, B, C, and M are parameters related to physical vehicle features, g is the gravitational constant, 9.81, and $\theta_t$ is the road grade.

$$f_t = \begin{cases} \alpha + \beta \cdot v_t + \gamma \cdot v_t^2 + \delta \cdot v_t^3 + \zeta \cdot a_t \cdot v_t & \text{if } P_{tract} > 0 \\ \alpha' & \text{if } P_{tract} \leq 0 \end{cases} \quad \text{Formula 7}$$

$$P_{tract} = A \cdot v_t + B \cdot v_t^2 + C \cdot v_t^3 + M \cdot a_t \cdot v_t + M \cdot g \cdot \sin \theta_t \cdot v_t \quad \text{Formula 8}$$

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for determining an optimal route between an origin and a destination, comprising:
   a server including a first machine readable storage memory storing a first multivariate probability distribution function (PDF) and a second multivariate probability distribution function (PDF), with said first multivariate PDF mapping a plurality of factors with a time to traverse each of a plurality of road segments, and with said second multivariate PDF mapping a plurality of factors with an energy required to traverse each of the plurality of road segments; and
   wherein at least one of the server and a controller in communication with the server is configured to:
      determine the optimal route between the origin and the destination based on both the first multivariate PDF and the second multivariate PDF;
      calculate weights for each of the plurality of road segments, with each of the weights being dependent upon at least one of: energy consumption, time required to traverse, and at least one objective pertaining to the corresponding one of the plurality of road segments; and
      determine a route cost for each of the plurality of possible routes, with the route cost being a summation of the weights of all of the road segments within a corresponding one of the possible routes;
   wherein determining the optimal route includes determining the one of the possible routes having the lowest route cost, and
   wherein calculating the weights for each of the plurality of road segments includes performing a multi-variate stochastic optimization for the one or more of: energy consumption, time required to traverse, and the at least one objective pertaining to the corresponding one of the plurality of road segments.

2. The system of claim 1, further including:
   a first data source providing said server with data regarding conditions on the plurality of road segments.

3. The system of claim 1, further including:
   a second data source providing said server with data regarding actual traversals of road segments within the plurality of road segments.

4. A method for determining an optimal route between an origin and a destination, comprising:
   determining a plurality of current features of each of a plurality of road segments, the current features including at least one of: traffic conditions, traffic control signal phase and timing (SPaT), a speed limit, traffic control signs, road curvature, road conditions, and road-specific driving style;
   estimating an amount of time required to traverse each of the road segments within the plurality of road segments based upon the current features of the road segments and a first multivariate probability distribution function (PDF);
   estimating an amount of energy required to traverse each of the road segments within the plurality of road segments based upon the current features of the road segments and a second multivariate probability distribution function (PDF);
   determining a plurality of possible routes between the origin and the destination, with each of the possible routes including one or more of the plurality of road segments;
   determining an optimal route for a combination of energy consumption and time from the possible routes;
   calculating weights for each of the plurality of road segments, with each of the weights being dependent upon at least one of: energy consumption, time required to traverse, and at least one objective pertaining to the corresponding one of the plurality of road segments; and
   determining a route cost for each of the plurality of possible routes, with the route cost being a summation of the weights of all of the road segments within a corresponding one of the possible routes;
   wherein the step of determining the optimal route includes determining the one of the possible routes having the lowest route cost, and
   wherein the step of calculating weights for each of the plurality of road segments includes performing a multi-variate stochastic optimization for the one or more of: energy consumption, time required to traverse, and the at least one objective pertaining to the corresponding one of the plurality of road segments.

5. The method of claim 4, further comprising:
   estimating a factor cost required to traverse each of the road segments within the plurality of road segments based upon the current features of the road segments and a third or higher number multivariate probability distribution function for a $j^{th}$ factor, where $j \in \{1, \ldots n\}$ for n features.

6. The method of claim 4, wherein determining the optimal route further comprises determining one of the possible routes that is optimized for an objective relating to at least one of: life of vehicle components, vehicle safety, environmental impact, scenery, proximity to nature, and driver preferences.

7. The method of claim 6, wherein determining the optimal route further comprises determining one of the possible routes that is optimized for an objective relating to life of vehicle components.

8. The method of claim 6, wherein determining the optimal route further comprises determining one of the possible routes that is optimized for an objective relating to vehicle safety.

9. The method of claim 6, wherein determining the optimal route further comprises determining one of the possible routes that is optimized for an objective relating to environmental impact.

10. The method of claim 6, wherein determining the optimal route further comprises determining one of the possible routes that is optimized for an objective relating to one of scenery or proximity to nature.

11. The method of claim 4, wherein the step of calculating weights for each of the plurality of road segments includes performing a bi-variate stochastic optimization for each of energy consumption and time to traverse the road segment.

12. The method of claim 4, wherein the at least one objective relates to: life of vehicle components, vehicle safety, environmental impact, scenery, proximity to nature, or driver preferences.

* * * * *